UNITED STATES PATENT OFFICE.

HENRY G. HARMELING, OF PADUCAH, KENTUCKY, ASSIGNOR OF ONE-HALF TO JOHN L. FAY, OF ST. LOUIS, MISSOURI.

METHOD OF PREPARING METAL TO BE GALVANIZED OR COATED.

1,334,092. Specification of Letters Patent. Patented Mar. 16, 1920.

No Drawing. Application filed July 29, 1918. Serial No. 247,145.

*To all whom it may concern:*

Be it known that I, HENRY G. HARMELING, a citizen of the United States, residing at Paducah, Kentucky, have invented a certain new and useful Improvement in Methods of Preparing Metal to be Galvanized or Coated, of which the following is a full, clear, and exact description, such as will enable others skilled in the art to which it appertains to make and use the same.

My invention relates to a new and original method of preparing metal that is to be galvanized, coated or plated with another metal, the principal object of my invention being to treat the metal which is to be coated or plated with a vegetable acid solution in order to thoroughly cleanse the surface of the metal and remove therefrom all scale, rust and like foreign substances so that said metal will readily receive and retain the coating metal such as spelter, copper and the like.

Metal treated in accordance with my invention will receive the coating metal much more readily than untreated metal, and the coating or plating is uniformly distributed over the surface of the treated metal. Further, by the use of my improved method, there is an entire absence of checks, flakes or pin-holes in the coating or plating and the latter is more firmly anchored to the base or treated metal by reason of the fact that the coating or plating metal enters the minute interstices in the surface of the base or treated metal and which interstices were originally occupied by scale, rust and the like.

My invention is based on the discovery that a heated solution containing a certain per cent. of vegetable acid, such as citric acid or acetic acid, will thoroughly and effectively cleanse the surface of the metal and will render the surface of said metal highly susceptible to the bath of coating metal such as spelter, copper or the like.

To each gallon of water used in the solution I add approximately eleven or twelve ounces of a pure vegetable acid, preferably citric acid or acetic acid, and this solution is heated to approximately two hundred twelve degrees F. The metal to be treated is first heated to approximately two hundred twelve degrees F., and said metal is then immediately placed in the heated acid solution and retained therein for a period of approximately twenty minutes. The metal thus treated is removed from the heated acid solution and after becoming thoroughly dry, it is ready to be galvanized, plated or coated.

It will be understood that in the manufacture of metal products, such as wire, sheet iron, or steel, the surface of the manufactured product is more or less covered or pitted with scale, rust and other foreign substances, the same being pressed into the surface of the metal by the rolls during the time of manufacture and by treating the manufactured metal in the manner herein disclosed, the entire surface of said metal is very thoroughly cleansed of all foreign substances and the minute interstices which were originally occupied by said foreign substances form pockets which receive minute portions or threads of the coating metal, thereby providing a firm and effective anchorage for the entire body of the coating metal.

Furthermore, as the surface of the base metal is thoroughly cleansed under the action of the heated acid solution, said treated metal or base will take or receive the coating metal very evenly, that is, the coating metal will be very uniformly distributed over the entire surface of the base.

While satisfactory results have been attained by the use of various vegetable acids, I prefer to use in the cleansing solution either citric acid or acetic acid, and, as heretofore stated, to combine approximately eleven or twelve ounces of the vegetable acid with each gallon of water. However, it will be understood that the proportions just mentioned may be varied slightly without departing from the spirit of my invention, and likewise that the temperature of the heated solution may be varied to suit different conditions, although I prefer not to heat the solution beyond boiling point, for such action, of course, will cause the solution to evaporate.

Having thus described my invention, what I claim is:

1. The hereindescribed method of preparing metal to be galvanized or coated which consists in subjecting the metal when heated to a temperature of approximately two hundred twelve degrees to an acetic acid solution, that is heated to a temperature of approximately two hundred twelve degrees.

2. The hereindescribed method of preparing metal to be galvanized or coated which consists in heating the metal to be treated to a temperature of approximately two hundred twelve degrees and subjecting said heated metal to a heated solution of water and acetic acid in the proportions of eleven or twelve ounces of acetic acid to each gallon of water.

In testimony whereof I hereunto affix my signature this 25th day of July, 1918.

HENRY G. HARMELING.